United States Patent Office 2,863,907
Patented Dec. 9, 1958

2,863,907

ALKYLARYLOXY ALKANOIC ACID ESTERS AND THEIR HYDROARYL ANALOGS

Louis Schmerling, Riverside, Ill., assignor to Universal Oil Products Company, Des Plaines, Ill., a corporation of Delaware No Drawing. Application September 4, 1953
Serial No. 378,660

6 Claims. (Cl. 260—473)

This application is a continuation-in-part application of my copending application, Serial No. 197,506, filed November 24, 1950, now abandoned.

This invention relates to a series of homologous compounds which have surface active properties and to the process for their preparation, some of the products being detergents in aqueous solvents, while others are detergents and/or wetting agents in essentially organic solvents. The products are particularly applicable for detergent use where non-irritating, nonionic materials are required or desirable, as in the preparation of detergents intended for human use. A particularly preferred species of the invention concerns novel compositions of matter comprising the alkylaryloxy acetic acid esters of the poly-(oxyalkylene) glycols.

It is an object of this invention to prepare nonionic surface active agents which are non-irritating to animal skin normally sensitive to alkaline or ionic detergents. Another objects of this invention is to prepare a series of compounds having surface active properties, certain members of the series being effective in non-aqueous solutions and other members of the series being effective in aqueous solvents, depending upon the solubility of the product in the respective type of solvent, as determined by the molecular structure and composition of the compounds provided.

In one of its embodiments the present invention concerns an ester having the empirical formula:

$$R'_nR—Ar—O(CH_2)_xCOO(ZO)_mH$$

wherein Ar is a polyvalent cyclic hydrocarbon radical selected from the mono- and dicyclic aromatic and hydroaromatic hydrocarbon groups; R is an alkyl group containing at least 4 carbon atoms, R' is an alkyl group containing not more than 3 carbon atoms, $n$ is a whole number having a value of from 0 to 2, $x$ is a whole number having a value of from 1 to 3, Z is an alkylene group containing from 2 to 5 carbon atoms per group and $m$ is a number having a value of from 2 to about 150.

Another embodiment of the present invention relates to a surface active agent comprising an alkylphenoxy acetic acid ester of a polyalkylene glycol having the empirical structural formula:

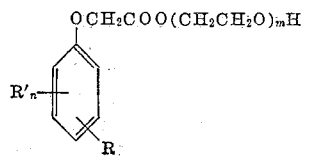

wherein R' is an alkyl group containing not more than about 3 carbon atoms per group, R is an alkyl group containing from 4 to about 18 carbon atoms per group, $n$ is a whole number having a value of from 0 to 2, and $m$ is a whole number having a value of from about 10 to about 50.

Still another embodiment of the invention relates to a process for the preparation of a surface active agent which comprises alkylating a nuclearly hydroxy-substituted cyclic hydrocarbon selected from the mono- and bicyclic aromatic and hydroaromatic hydrocarbons with an alkylating agent containing from 4 to about 18 carbon atoms, condensing the resulting algylated, hydroxy-substituted cyclic hydrocarbon compound with a haloalkanoic acid containing up to 4 carbon atoms to form an alkyl cyclic hydrocarbon oxyalkanoic acid and condensing the resulting product with a poly-(oxyalkylene)-glycol containing at least 2, up to about 150 oxyalkylene groups per molecule to form a hydrocarbon-substituted oxyalkanoic acid ester of said glycol.

Other objects and embodiments of the invention relating to specific reactants, particular means of effecting the various reaction stages involved in the present process and to other specific aspects of the invention will be referred to in greater detail in the following description.

The products of the present invention are characterized as alkyl-substituted cyclic hydrocarbon-oxyalkanoic acid esters of poly-(oxyalkylene) glycols or, alternatively, as alkyl-substituted cyclic hydrocarbon ethers of carboxy esters of poly-(oxyalkylene) glycols. The products of this invention comprising specific compositions of matter, may also be defined as certain cyclic hydrocarbon-substituted carbonyl-polyoxa-alkanes or mixtures thereof. Definite polyoxa-alkane derivatives may be prepared from specific glycols and poly-(oxyalkylene) glycols, although certain products of this invention in which a long chain, ω-hydroxy-poly-(oxyalkylene) group is present in the structure of the compound as the hydrophilic group, are generally mixtures of compounds comprising members having oxa-alkane radicals of varying chain length. The latter mixtures are usually derived from mixed long chain poly-(oxyalkylene) glycols charged into the esterification reaction of the present process as a mixture of glycols of varying chain lengths, the individual glycols in the mixtures varying by several oxyalkylene units per molecule, more and less, from the average number of oxyalkylene units per molecule for the entire mixture. When the present alkanoic acid esters are named in accordance with the nomenclature system in which the polyoxyalkylene ethers are indicated as derivatives of the poly-oxa-alkanes (the I. U. C. or International Union Chemical system) the esters of the low molecular weight alkylene and poly-(oxyalkylene) glycols may be named as specific compounds, whereas the esters of the high molecular weight poly-(oxyalkylene) glycols are named as mixtures of various esterified poly-(oxyalkylene) glycols. Thus, the alkyl-cyclic hydrocarbon substituted oxyalkanoic acid esters of the simple glycols, such as diethylene glycol, triethylene glycol, tetra-ethylene glycol, etc., have the following structural formulas and are named in accordance with the I. U. C. nomenclature system as follows:

Alkylcyclic hydrocarbon-oxyacetic acid esters of diethylene glycol:

RR-cyclyl-O—CH$_2$COOC$_2$H$_4$O—C$_2$H$_4$OH 9-(alkylcyclyl)-7-oxo-3,6,9-trioxanonan-1-ol.
Alkylphenyl-oxypropionic acid ester of triethylene glycol:

RR'-phenyl-OC$_2$H$_4$COO—C$_2$H$_4$O—C$_2$H$_4$O—C$_2$H$_4$OH 13-(alkylphenyl)-10-oxo-3,6,9,13-tetroxatridecan-1-ol.
Alkylcyclohexyl-oxybutyric acid ester of tetraethylene glycol:

RR'-cyclohexyl-OC$_3$H$_6$COO—C$_2$H$_4$—
        O—C$_2$H$_4$—O—C$_2$H$_4$—O—C$_2$H$_4$OH 17 - (alkylcyclohexyl) - 13 - oxo - 3,6,9,12,17 - pentoxaheptadecan-1-ol.

It is evident that when the present compositions are named in accordance with the I. U. C. system, above exemplified, the name of the analogous alkane hydrocarbon corresponding to the name of the oxa-alkane radical of the compound is the name of a higher homolog as the number of oxyalkylene units in the chain increases. It is also evident that when the composition is prepared under conditions whereby the glycol-ether poly-(oxyalkylene) gylcol undergoing condensation with the alkylcyclic hydrocarbon-oxyalkanoic acid is a mixture of glycols comprising a number of individual glycols varying in chain length and in the number of oxyalkylene units per molecule the product may be named in accordance with the I. U. C. system as a mixture of individual alkanes in which the number of atoms in the chain corresponds to a certain average number for the mixture of individual compounds as a whole. Thus, a product having an average number of 50 oxyalkylene units per molecule in the hydrophilic chain may be comprised of a mixture of individual compounds having from 40 to 60 oxyalkylene units and can be named by the I. U. C. system as a mixture of the corresponding oxa-alkanes. The alkylcyclic hydrocarbon radical may also be referred to as an alkylcyclyl radical, whether of the aryl or hydroaryl series and such nomenclature is adopted herein to express generic classification of the mono- and dinuclear aromatic and hydroaromatic cyclic hydrocarbon radicals contemplated in this invention. In general, the number and length of the alkyl substituents on the cyclic hydrocarbon nucleus, the number of oxyalkylene groups per molecule, the chain length of the alkylene group in the poly-(oxyalkylene) chain of the molecule, and the choice of a mono- or bicyclic hydrocarbon as the structure of the compound to be prepared in any particular instance are so correlated as to provide a compound in which the hydrophobic properties of the alkylaryl portion of the molecule is substantially in balance when dissolved in a solvent with the hydrophilic oxyalkanoic acid ester portion of the molecule, the internal balance of the hydrophilic group with the hydrophobic group being theoretically essential to the formation of micelle aggregates capable of detersive action when the compound is in solution. Certain derivatives of the present series of compounds in which the hydrophilic portion of the molecule is not sufficient to solubilize the product out of water, are nevertheless highly effective surface active agents, wetting agents, etc. in non-aqueous solvents, such as hydrocarbons. Certain of the present products are also capable of maintaining finely divided solids in suspension and when incorporated into lubricating oils, tend to prevent deposition of sludge from such oils during use. Thus, of the present products, which in each case have the following empirical structural formula:

R'$_n$R–Ar–O–(CH$_2$)$_x$COO(ZO)$_m$H those derivatives in which R' contains more than 1 carbon atom per group, up to about 3, $n$ is 1 or 2, Z is from 2 to 5, particularly from 3 to 5, and $m$ is a small number, from 2 to about 8, are relatively insoluble in water, but soluble in organic solvents, such as hydrocarbons, ethers, alcohols, etc. and may be utilized as detergents and surface active agents in such non-aqueous systems.

The compositions of the present invention are formed essentially by the condensation of an alkylcyclic hydrocarbon-substituted oxyalkanoic acid with a poly-(oxyalkylene) glycol containing from about 2 to about 150 oxyalkylene units per molecule, with an alkylene oxide having from 2 to 5 carbon atoms, or with other compounds, such as the halohydrins, capable of condensing with an hydroxyl group to form a poly-(oxyalkylene) chain. The cyclic hydrocarbon substituted oxyalkanoic acid intermediate reactant is a synthetic compound which must ordinarily be prepared at a stage preliminary to the condensation reaction in which the final product is formed. It may be synthesized by any suitable means, one of the preferred procedures, because of its simplicity comprising the interaction of an alkylphenol, alkylnaphthol, or an alkylcyclic alcohol with a haloalkanoic acid, such as chloroacetic or bromoacetic acid in the presence of an alkali metal base to form the corresponding alkali metal salt of the substituted acid. Other methods for the preparation of the above compounds are well-known and are also available for effecting the synthesis.

The alkyl-substituted phenols, naphthols and cyclic alcohols utilized in the initial condensation reaction to form the intermediate reactant involved in the present process are prepared by alkylating the corresponding phenol, naphthol of cyclic alcohol with an alkylating agent capable of yielding, in the presence of an acidic alkylation catalyst, an alkyl group containing from about 4 to about 18 carbon atoms. The alkylation or condensation reaction of the hydroxy-substituted cyclic hydrocarbon may be effected in the presence of a suitable catalyst of the type characterized as an acid-acting condensation catalyst, hereinafter more fully described. Suitable hydroxy-substituted cyclic hydrocarbon compounds utilizable as starting material in the alkylation reaction to form the intermediate alkylate may be selected from the mono- or bicyclic hydroxy-substituted hydrocarbons and contain a nuclearly displaceable hydrogen atom on the hydrocarbon nucleus; these compounds may also contain multiple hydroxyl groups, although the mono-hydroxy compounds are preferred. Typical specific hydroxy-substituted cyclic hydrocarbons utilizable as starting materials in the alkylation reaction include phenol and its partially or completely hydrogenated analogs, including cyclohexanol, the nuclearly alkyl-substituted phenols, including the cresols (ortho-, meta-, and paracresols) and xylenols as well as their partially or completely hydrogenated cycloaliphatic analogs such as the dimethylcyclohexanols, methylethyl and diethylcyclohexanols, the polyhydroxy-substituted cyclic hydrocarbon compounds, such as hydroquinone, catechol, ortho-, meta-, and paradihydroxydiphenyl compounds, the hydroxy naphthalenes such as alpha- and beta-naphthol, and others which are alkylatable by virtue of the presence of at least 1 nuclearly displaceable hydrogen atom on the aryl nucleus. In the preparation of water-soluble detergents and wetting agents, it is generally preferred that the hydroxy-substituted cyclic hydrocarbon reactant utilized in the alkylation reaction have not more than 1 short chain, nuclearly substituted alkyl group containing up to about 3 carbon atoms per group, and preferably not more than 1 carbon atom per group, such as the cresols and the mono-methyl-substituted naphthols, cyclohexanols, etc. When the products are to be utilized as detergents or wetting agents in non-aqueous solvents, such as lubricating oils and other liquid hydrocarbons, the hydroxy-substituted cyclic hydrocarbon reactant utilized in the alkylation reaction may contain up to about 2 short chain alkyl groups per molecule as nuclear substituents, and each alkyl group may contain as many as 3 carbon atoms per group, represented for example by such compounds as p-isopropylphenol, 2-ethyl-5-methylphenol, dimethylnaphthol, 2,5-dimethylcyclohexanol, and others. The dicyclic hydroxyaromatic and hydroxycycloaliphatic compounds utilized as starting materials in the alkylation reaction are also generally more suitable for the preparation of surface active and wetting agents for use in non-aqueous solvents. In general, the use of mono- and dicyclic hydrocarbon groups in the structure of surface-active agents, and particularly detergents, and the use of the mono- and dimethyl, ethyl and propyl cyclic hydrocarbon groups for such nuclear hydrophobic radicals is well-known in the detergent art. These hydrocarbon radicals appear to have the requisite hydrophobic characteristics essential in the development of a detersive product, such generalizations regarding the hydrophobic group finding their greatest present day application in the alkylarylsulfonate detergents and wetting agents. The nuclear long chain alkyl derivatives of the hydroxy-substituted cyclic hydrocarbons which are intermediates in the preparation of the present surface active agents are formed by alkylation of the the above-indicated hydroxy-substituted cyclic hydrocarbons with an alkylating agent having a chain length and structure corresponding to the desired long chain alkyl group present in the structure of the final product; that is, containing from 4 to about 18 carbon atoms per alkyl group. The preferred products of the mono-nuclear series contain long chain alkyl substituents having from about 5 to about 15 carbon atoms per group, while the preferred products of the dinuclear series contain from 1 to 9 carbon atoms in the nuclearly substituted alkyl group. These may be produced by any suitable means of synthesis, one of the most readily available means comprising the alkylation of the hydroxy-substituted cyclic hydrocarbon starting material with an alkylating agent such as an olefinic hydrocarbon containing from about 4 to about 18 carbon atoms per molecule in the presence of an acid-acting condensation catalyst, such as concentrated sulfuric, or hydrofluoric acids or a Friedel-Crafts catalyst such as an aluminum halide. The hydroxy-substituted cyclic hydroaromatic compounds may be prepared by hydrogenation, either partially or completely, of the corresponding aromatic starting material or the alkylated aromatic compound formed as an intermediate alkylate. The desired nuclear hydrogenation of the aromatic or alkylaromatic compound may be effected by contacting the charging stock with a hydrogenation catalyst, such as a supported nickel catalyst, in the presence of hydrogen, at temperatures of from about 50° to about 300° C. and at hydrogen pressures of from 2 to about 100 atmospheres, in accordance with well known hydrogenation procedures.

In the production of the final surface active product of this invention, the intermediate alkyl-cyclic hydrocarbon oxyalkanoic acids are prepared by the condensation of the intermediate alkyl hydroxy-substituted cyclic compound with a halogen substituted alkanoic acid corresponding to the alkanoic acid derivative ultimately desired. The halogen-substituted alkanoic acids may be selected from the corresponding monobromo-, monochloro and monoiodo fatty acids containing from 2 to 4 carbon atoms, the condensation reaction being generally effected in the presence of an aqueous alkali metal hydroxide whereby condensation occurs between the resulting alkali metal salt of the hydroxy-substituted cyclic hydrocarbon reactant and the halogen-substituted alkanoic acid. It is usually preferable to carry out the reaction with hexahydroaromatic hydroxy compound in the presence of dissolved alkali metal. Although the monochloro- and monobromo-acetic acids are the preferred reactants in the preparation of the oxyalkanoic acid derivative, other halo alkanoic acids utilizable herein include the alpha and beta monochloro-, monobromo-, and monoiodo-propionic acids and the alpha, beta and gamma monochloro-, monobromo-, and monoiodo-butyric acids. In this reaction the mechanism is believed to be essentially the condensation of the hydroxy group or the alkali metal salt of the hydroxy-substituted cyclic hydrocarbon reactant and the halogen atom of the monohalogen-substituted alkanoic acid reactant whereby hydrogen halide or the alkali metal halide salt is eliminated and a new oxygen-carbon linkage is formed between the oxygen atom formerly comprising the hydroxyl group of the cyclic compound and the carbon atom formerly comprising the carbon-halogen linkage of the haloalkanoic acid. The preferred condensation reaction conditions both with respect to the rate of reaction and completeness of the condensation are temperatures in the range of the boiling point of water. The reaction is also promoted by stirring or shaking the reactants in the presence of a relatively concentrated aqueous solution or suspension of an alkali metal or alkaline earth metal hydroxide, oxide, or carbonate, such as sodium and potassium hydroxide and carbonate, calcium and magnesium hydroxide or carbonate and other basic compounds, such as the organic amines, alkanol amines, etc. The reaction proceeds at temperatures of from about 50° to about 150° C., although the reaction is conducted most conveniently by refluxing the reaction mixture at the boiling point of the aqueous alkaline solution. Since the monohaloalkanoic acid is the least expensive of the reactants and the reaction is favored by an excess of either reactant, it is generally preferred to utilize from about 1 to 1 to about 2 to 1 or higher molar proportions of the monohalo-alkanoic acid to hydroxy-substituted cyclic hydrocarbon reactant in the condensation reaction.

One of the preferred procedures for obtaining a maximum yield of condensation product comprises reacting the monohaloalkanoic acid reactant, preferably monochloro-acetic acid, with the hydroxy-cyclic hydrocarbon reactant in the presence of an aqueous solution of sodium hydroxide containing from about 2 to about 6 mols of the alkali metal hydroxide per mol of the hydroxy-aromatic hydrocarbon reactant (or about 1 mole of alkali metal per mole of the hydroxyhexahydroaromatic compound in addition to an excess of alkali hydroxide) at a temperature of from about 90° to about 140° C. and at superatmospheric pressures corresponding to the vapor pressure of the aqueous mixture at the particular temperature, the reaction being effected in a pressure bomb, such as a rotating autoclave to obtain maximum interfacial contact between the aqueous and organic phases. Following completion of the reaction, usually after a reaction period of from about 0.5 to about 6 hours, the mixture is cooled, acidified to a pH of about 7 or less with a strong mineral acid, thereby liberating the free alkyl-cyclic hydrocarbon-alkanoic acid intermediate product and thereafter extracting the resulting aqueous mixture with a relatively water-immiscible solvent of the organic phase, such as diethyl ether, to separate the same from the aqueous phase. The resulting oxyalkanoic acid intermediate product recovered by evaporation of the solvent from the extract phase is thereafter purified, if necessary, to separate the alkanoic acid derivative from any unreacted alkyl-hydroxy-cyclic hydrocarbon compound, if any. The resultant product is reserved for the subsequent preparation of the final detergent product.

In specifying the preferred reaction conditions and procedures for effecting the condensation reaction, it is not intended that the statement of such preference be interpreted to exclude other operable methods of preparation. Thus, for example, the reactants may be simply heated together in the absence of other reagents, or they may be reacted in the presence of water alone, in the absence of a base or other reagent. The preferred procedure will ultimately depend upon the reactivity of the individual reactants selected for the preparation of a particular product.

The formation of the ultimate surface active agents, detergents and wetting agents provided in the present invention involves the condensation of the alkylcyclic hydrocarbon oxyalkanoic acid intermediate with a polyalkylene glycol, an halohydrin or an alkylene oxide polymerized in situ during the reaction. The resulting condensation reaction is essentially an esterification reaction which may be effected by any convenient or suitable means, and is preferably catalyzed with an alkaline base, such as an alkali metal hydroxide, a basic amine, such as pyridine or trimethylamine, although in many instances the latter catalysts are not required. The polyalkylene glycols or alkylene oxides utilizable in the esterification reaction are selected from the ether glycols, commonly referred to as polymers of the simple monomer glycols and the alkylene oxides containing from about 2 to about 5 carbon atoms per alkylene group, including such alkylene oxides as ethylene oxide, a propylene oxide (such as trimethylene oxide of methylethylene oxide), a butylene oxide (such as isobutylene oxide), and the amylene oxides, or such polyalkylene glycols as polyethylene glycols, polypropylene glycols, polybutylene glycols, and polyamylene glycols. Thus, it is possible to form the poly-(oxyalkylene) chain prior to the esterification reaction by utilizing a polyalkylene glycol having the desired number of oxyalkylene units, usually in the form of a mixture of ether-glycols containing an average number of oxyalkylene units for the mixture as a whole, or the poly-(oxyalkylene) chain may be formed in situ by reacting the alkyl-cyclic hydrocarbon-oxyalkanoic acid intermediate with an alkylene oxide and continuing the condensation of the alkylene oxide in the reaction mixture until the number of alkylene oxide molecules adding to the poly-(oxyalkylene) chain yield a radical containing the desired number of oxyalkylene units per molecule. The condensation of the hydrocarbon-substituted oxyalkanoic acid with a polyalkylene glycol or an alkylene oxide introduces the hydrophilic poly-(oxyalkylene) group, essential for surface activity or detergency of the resulting compound, into the molecular structure of the condensation product and tends to solubilize the product in water by virtue of the hydrophilic poly-(oxyalkylene) group. For the ultimate production of detergents effective in aqueous media, the number of water-solubilizing groups present in the compound relative to the size and effect of the hydrophobic group, generally must predominate; for the preparation of such products, therefore, the molecular weight of the polyalkylene glycol must be large and the number of oxyalkylene groups per molecule must also be relatively large, the molecular weight increasing as the chain length of the alkylene group increases from 2 to 5. Of the polyalkylene glycols for this purpose, polyethylene and polypropylene glycols containing from about 5 to about 100 or 120 oxyalkylene groups per molecule are preferred. For the production of relatively water-insoluble surface active agents and detergents, for example, for use in non-aqueous systems, the polyalkylene glycol utilized in the esterification is preferably selected from the polypropylene, polybutylene and polyamylene glycols, although polyethylene glycol may also be utilized if the number of hydrophilic oxyalkylene groups per glycol molecule is relatively low, generally from about 2 to about 20 oxyethylene groups per molecule, the limitation generally tending to limit its water solubility and enhance its solubility in organic solvents.

While the esterification reaction may be effected at temperatures below about 100° C., and at atmospheric pressure, a maximum yield of product is obtained within a shorter reaction period at temperatures above about 70° C., preferably from about 100° to about 150° C. and at superatmospheric pressures. The preferred method of effecting the esterification reaction comprises heating the reactants in the presence of one of the aforementioned basic catalysts. Another alternative method of effecting the reaction comprises first converting the alkylcyclic hydrocarbon-oxyalkanoic acid intermediate into a more reactive acyl halide, for example, by reaction with thionyl chloride, phosphorus trichloride, or with phosphorus pentachloride, and thereafter reacting the resulting acyl halide with the desired glycol. Another alternative consists in heating the alkyl-cyclic hydrocarbon oxyalkanoic acid halide with an alkylene oxide, for example ethylene oxide.

When phenol is utilized as the initial hydroxy-substituted cyclic hydrocarbon reactant subject to alkylation and subsequently to condensation with the haloalkanoic acid reactant and glycol or alkylene oxide, the product may be represented by the empirical formula:

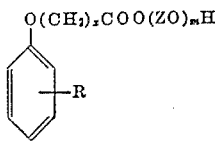

wherein R represents an alkyl group containing from about 4 to about 18 and preferably from about 6 to about 15 carbon atoms, $x$ is a small whole number having a value of from about 1 to 3 (preferably 1), and when a water-soluble product is desired, Z is a divalent alkylene group containing from 2 to 5 carbon atoms per group, preferably either 2 or 3, and $m$ is a whole number having a value of from 2 to about 150, preferably from about 5 to about 150. Since the polyalkylene glycols are normally composed of a mixture of individual polymers and rarely, except for the lower molecular weight members containing up to about 4 oxyalkylene units per molecule, are composed solely of one polymer only, it is understood that in specifying a range of values for the variable $m$, above, such enumeration is intended merely to specify an average value for the number of oxyalkylene units in the mixture of polyalkylene glycols and in such mixtures, the number of carbon atoms in the alkylene group, Z, may also vary.

An alternative method of preparing the present products comprises reacting the halo-alkanoic acid reactant in a preliminary stage of the process with the desired polyalkylene glycol or alkylene oxide, thereby forming the corresponding halo-alkanoic acid ester of the polyalkylene glycol, the latter ester being thereafter condensed with the hydroxy-substituted cyclic hydrocarbon reactant in the presence of an alkali metal hydroxide, if desired.

Although the present invention is particularly directed to the mono- and dicyclic aromatic hydrocarbon species of the cyclic hydrocarbon derivatives, as herein provided, the scope of the invention also contemplates the partially or completely hydrogenated analogs of such aryl nuclei and these may be prepared by initially starting the synthesis with the corresponding aromatic phenols, naphtols, etc., or their alkyl-substituted aromatic derivatives, hydrogenating the aromatics as heretofore described and effecting the subsequent condensation reactions to form the ultimate products. The hydro-derivatives may also be prepared via hydrogenation of any of the succeeding intermediates or the final ester product by procedures essentially similar to the hydrogenation of the aromatic starting material or its alkylate.

The present products are represented as containing a terminal hydroxyl group at the end of the poly-(oxyalkylene) chain, but if a product more readily soluble in organic solvents is desired, the terminal hydroxyl group may be etherified or esterified by reacting the product with an esterifying agent such as acetyl chloride or an etherifying reagent such as methyl alcohol or dimethylsulfate.

The present invention is described with respect to specific embodiments thereof in the following examples, which however, are not intended to define the general scope of the invention in strict accordance therewith but, rather, are intended to be merely illustrative of the invention by description of particular species of the invention.

EXAMPLE I p-Tert-amylphenoxyacetic acid is prepared by the reaction of equimolar quantities of commercial p-tert-amylphenol and chloroacetic acid in the presence of two molar proportions of potassium hydroxide in aqueous solution at the reflux temperature of the solution. Acidification with dilute hydrochloric acid yields a precipitate which is taken up in ether, washed with water and then extracted with sodium bicarbonate solution. Acidification of the solution yields an oil which is extracted with ether, and the extract is washed, dried and distilled. The residue, p-tert-amylphenoloxyacetic acid, is an oil which crystallizes on standing.

The amylphenoxyacetic acid is converted to the acid chloride by heating with a molar excess of phosphorus pentachloride and the resulting intermediate converted to a detergent ester by reaction with a polyethylene glycol. For this purpose, polyethylene glycol having an average molecular weight of 600 is added to the acid chloride and the mixture heated to drive off hydrogen chloride. The ester product yields a turbid solution when added to water. The solution is an active wetting agent and has appreciable detergent action.

An alternative method of preparing the above compound and derivatives thereof in which the poly-(oxyethylene) chain may be increased in length at will to determine the optimum chain length of the hydrophilic poly-(oxyethylene) group consists in reacting the acid chloride of the p-tert-amyl-phenoxyacetic acid intermediate product with ethylene glycol in the presence of a molar equivalent of sodium hydroxide and thereafter reacting the resulting ester of ethylene glycol with a sufficient quantity of an alkylene oxide such as ethylene oxide to provide the desired chain length of the resulting poly-(oxyethylene) radical, the reaction being run at sufficient pressure to provide a liquid phase reaction mixture. Other alkylene oxides may be charged to the condensation reaction mixtures such as propylene oxide or a mixture of propylene and ethylene oxides, the latter reaction mixture producing a poly-(oxyalkylene) chain containing both oxyethylene and oxypropylene units in the same chain. The condensation reaction of the alkylene oxide with the glycol ester is promoted by the presence of a basic catalyst such as a small quantity of pyridine, powdered sodium hydroxide, etc. The optimum chain length of the poly-(oxyalkylene) chain is determined by measuring the detergency of each member of a series of compounds prepared in this manner; the products containing an average of 9 to 12 oxyalkylene units in the poly-(oxyalkylene) chain exhibit maximum detergency.

EXAMPLE II

A series of alkylphenol starting materials, the alkyl groups of which are hexyl, nonyl, dodecyl, pentadecyl and octadecyl are prepared in a preliminary stage of the process by the alkylation of phenol with propylene polymer fractions containing a predominant proportion of olefins in which the number of carbon atoms correspond to the desired alkyl group of the alkyl phenol. The alkylates are prepared in relatively high yields by reacting a mixture containing about 3 molar proportions of phenol per mole of each of the indicated olefinic propylene polymer fractions in the presence of acetic acid solvent containing several drops of concentrated sulfuric acid catalyst at a temperature of about 70° C. The phenol alkylate from each preparation is separated from the respective alkylation products, washed, and separately reserved for conversion to the corresponding alkylaryloxy alkanoic acid ester detergents.

A series of alkylphenoxy acetic acids in which the alkyl groups correspond to the respective alkylates prepared as indicated above are formed by reacting approximately equimolar proportions of monochloroacetic acid with the indicated phenol alkylates. For this purpose, the above indicated alkylphenols and monochloroacetic acid are introduced into 10 volumes of an aqueous solution of sodium hydroxide containing 3 molar proportions of the caustic. The resulting mixture is thereafter heated in a closed, rotating pressure autoclave at a temperature of 110° C. for 6 hours as the autoclave is slowly rotated to effect mixing of the reactants. Following the indicated period of reaction, the contents of the autoclave are cooled to room temperature, acidified with dilute sulfuric acid, extracted with diethyl-ether to remove the alkylphenoxyacetic acid, unreacted alkyl phenol and chloroacetic acid reactants, and the ether solution washed with water and then extracted with an aqueous solution of sodium bicarbonate to obtain a solution of the sodium phenoxyacetate from which the alkylphenoxyacetic acid may be recovered in substantially pure form by acidifying the solution. The resulting alkylphenoxyacetic acid derivatives are substantially insoluble in water, but relatively soluble in organic solvents such as ethers and alcohols.

In order to establish the operability and utility of the alkylphenoxy derivatives of other alkanoic acid esters, the dodecylphenol alkylate is condensed with beta-chloropropionic acid and gamma-chlorobutyric acid to form the corresponding alkylaryloxy alkanoic acid intermediates and to further illustrate that as the alkanoic acid chain exceeds 4 carbon atoms, the surface activity tends to decrease, the dodecylphenoxyvaleric acid intermediate is prepared for subsequent condensation with polyalkylene glycols. Alkylnaphthoxyacetic acid and its corresponding esters of various polyalkylene glycols are also prepared in order to demonstrate the utility of the bicyclic oxyalkanoic acid esters.

The alkylphenoxy and alkylnaphthoxy acetic acid esters as well as the propionic, butyric, and valeric esters of polyethylene glycols, in which the glycols contain from about 10 to about 150 oxyethylene groups per molecule (having molecular weights of from about 450 to about 6000), are prepared from specific mixtures of various polyethylene glycols substantially in accordance with the procedure indicated above in Example I for each of the alkylcyclic hydrocarbon oxyalkanoic acids, the only variation in procedure being the use of different polyethylene glycol charging stocks in the esterification reaction mixture. The products vary in physical form from thick liquids (for the lower polymer of ethylene glycol) to solid waxy materials (for the higher polymers of ethylene glycol). The following Table I gives the detergency, solubility and physical form for each of the above-specified products.

Table I

PHYSICAL PROPERTIES, INCLUDING DETERGENCY, OF VARIOUS ALKYLPHENYL- AND ALKYLNAPHTHYL-OXYALKANOIC ACID ESTERS OF POLYETHYLENE GLYCOLS

| Cyclic Hydrocarbon Radical | Nuclear Alkyl Substituent | Alkanoic Acid Chain | Detergency [1] of compounds having the following average number of oxyalkylene units per molecule | | | | | | | |
|---|---|---|---|---|---|---|---|---|---|---|
| | | | 2 | 6 | 12 | 18 | 24 | 50 | 80 | 120 |
| Phenyl | Hexyl | Oxyacetic | — | 0 | ++ | ++ | + | + | + | — |
| Do | Nonyl | do | — | 0 | ++ | ++ | + | + | + | 0 |
| Do | Dodecyl | do | — | — | + | ++ | ++ | ++ | ++ | + |
| Do | Pentadecyl | do | — | — | 0 | + | ++ | ++ | ++ | + |
| Do | Octadecyl | do | — | — | — | 0 | + | + | + | 0 |

The above products were liquids to pasty solids when the number of oxyethylene units varied from 2 to 6 for each alkylate and increased in hardness and were more soluble in water as the number of oxyethylene units in the esters increased.

| Phenyl | Dodecyl | Oxypropionic | (2) | (2) | 0 | ++ | ++ | (2) | + | ---- |
| Do | do | Oxybutyric | (2) | (2) | (2) | 0 | ++ | + | (2) | (2) |
| Do | do | Oxyvaleric | (2) | (2) | (2) | — | 0 | 0 | — | (2) |

The above products were pasty solids for the oxypropionic acid derivatives prepared and solids for the oxybutyric and oxyvaleric derivatives.

| Naphthyl | Butyl | Oxyacetic | (3) | (3) | (3) | — | + | + | ++ | + |
| Do | Amyl | do | (3) | (3) | (3) | — | + | + | + | — |
| Do | Nonyl | do | (3) | (3) | (3) | — | + | + | + | — |
| Do | Dodecyl | do | (3) | (3) | (3) | (3) | 0 | + | + | — |

[1] Detergency compared to sodium laurate at equivalent concentrations in aqueous solutions, where soluble, in accordance with the standard Launder-O-Meter procedure. The following designations are used in the above table:

— detergency inferior to standard
0 detergency approximately same as standard
+ detergency slightly superior to standard
++ detergency much superior to standard

[2] Not prepared.
[3] Not soluble in water, but soluble in alcohol and liquid hydrocarbons.

I claim as my invention:

1. A nuclearly mono-alkyl-substituted aryloxyalkanoic acid ester of a poly-(oxyethylene) glycol, in which the alkyl group contains from 4 to about 18 carbon atoms, the aryl radical is selected from the group consisting of phenyl and naphthyl, and the number of oxyethylene units per molecule is from about 10 to about 50.

2. A nuclearly mono-alkyl-substituted phenoxyacetic acid ester of a poly-(oxyethylene) glycol, in which the alkyl group contains from 4 to about 18 carbon atoms, and the number of oxyethylene units per molecule is from about 10 to about 50.

3. A nuclearly mono-alkyl-substituted aryloxyalkanoic acid ester of a poly-(oxyalkylene) glycol, in which the alkyl group contains from 4 to about 18 carbon atoms, the alkylene group contains from 2 to 5 carbon atoms, the number of oxyalkylene units per molecule is from about 10 to about 50, and the aryl radical is selected from the group consisting of phenyl and naphthyl.

4. A nuclearly mono-alkyl-substituted naphthyloxyalkanoic acid ester of a poly-(oxyalkylene)-glycol, in which the alkyl group contains from 4 to about 18 carbon atoms, the alkylene group contains from 2 to about 5 carbon atoms, and the number of oxyalkylene units per molecule is from about 10 to about 50.

5. A nuclearly mono-alkyl-substituted naphthyloxyalkanoic acid ester of a poly-(oxyethylene) glycol, in which the alkyl group contains from 4 to about 18 carbon atoms, and the number of oxyethylene units per molecule is from about 10 to about 50.

6. An ester having the empirical formula:

$$R\text{---}Ar\text{---}O\text{---}(CH_2)_x COO(ZO)_m H$$

wherein Ar is an aryl hydrocarbon radical selected from the group consisting of phenyl and naphthyl, R is an alkyl group containing at least 4 carbon atoms, $x$ is a whole number having a value of from 1 to 3, Z is an alkylene group containing from 2 to 5 carbon atoms and $m$ is a number having a value of from 2 to about 150.

References Cited in the file of this patent

UNITED STATES PATENTS

| 1,974,810 | Dvorniboff | Sept. 25, 1934 |
| 2,179,209 | Daimler et al. | Nov. 7, 1939 |